(12) United States Patent
Chang et al.

(10) Patent No.: US 6,324,552 B1
(45) Date of Patent: *Nov. 27, 2001

(54) BROWSERS FOR FOCUSED ACCESS OF DATA

(75) Inventors: Sih-Pin Chang, Old Tappan, NJ (US); Ephraim Feig, Chappaqua, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,875

(22) Filed: Nov. 25, 1997

(51) Int. Cl.[7] .......................... G06F 15/00; G06F 15/173
(52) U.S. Cl. .......................... 707/501; 707/513; 709/225
(58) Field of Search .................. 707/500–501, 707/513, 104, 526; 395/200.3, 200.31, 200.33, 200.79, 200.57, 187.01; 709/200–203, 223–225, 229, 232

(56) References Cited

U.S. PATENT DOCUMENTS

| | | | |
|---|---|---|---|
| 5,864,604 | * 1/1999 | Moen et al. | 379/88 |
| 5,867,667 | * 2/1999 | Butman et al. | 395/200.79 |
| 5,889,958 | * 3/2000 | Willens | 395/200.59 |
| 5,892,905 | * 4/1999 | Brandt et al. | 713/201 |
| 5,898,830 | * 4/1999 | Wessinger, Jr. et al. | 395/187.01 |
| 5,916,302 | * 6/1999 | Dunn et al. | 709/204 |
| 6,035,332 | * 3/2000 | Ingrassia, Jr. et al. | 709/224 |
| 6,038,601 | * 3/2000 | Lambert et al. | 709/226 |
| 6,067,623 | * 5/2000 | Blakley, III et al. | 713/201 |

* cited by examiner

*Primary Examiner*—Hosain T. Alam
*Assistant Examiner*—Alford W. Kindred
(74) *Attorney, Agent, or Firm*—Ohlandt, Greeley, Ruggiero & Perle, LLP; Gail H. Zarick, Esq.; IBM Corporation

(57) ABSTRACT

The present invention provides a browser which utilizes a Web access controller to limit access to pre-selected web sites. Such a browser is suitable for use in education, for example, where the intent is to keep students focused on a particular subject by restricting their access to predetermined relevant sites. The browser also has a "depth" parameter, whereby users are enabled to browse from those web sites on the select list to unlisted sites which are within the depth parameter away from the listed sites. This provides the users with the surfing capabilities inherent in the web. The Web access controller provides for a safer environment for children to browse through the Internet and a worry-free tool for parents.

11 Claims, 5 Drawing Sheets

| HEADER | PAGE (1) | PAGE (2) | ... | PAGE (N) |

| NAME | CODE | DEFAULT.html |

| ADDRESS (j) | DESCRIPTION (j) | DEPTH (j) |

BROWSERS FOR FOCUSED ACCESS OF DATA

BACKGROUND

1. Field of the Invention

The present invention relates to a browser, and more specifically, to a browser equipped with the function to limit access to a restricted set of URLs. It also relates to data structures of supporting servers for servicing such browsers.

2. Description of the Related Art

A hypertext document is one which is linked to other documents via hyperlinks. A hyperlink often appears in a hypertext document as a piece of highlighted text. The text is usually a word or phase describing something of which a user might want further information. When the user activates the hyperlink, typically by clicking on it using a mouse, the user's view is changed so as to show the linked document, which typically contains more information on the highlighted word or phase concerned. Hyperlinks make it easy to follow cross-references between documents. Hypermedia documents are hypertext documents with multimedia capabilities. The regions on the screen which are active hyperlinks are called hot-links.

Nowadays, most people are familiar with the application of hypertext by using a mouse to click on hot-links on computer displays of homepages from the World Wide Web (the Web) on the Internet. Data on the Web is located via URLs. URL stands for "Uniform Resource Locator." It is a draft standard for specifying as object on the Internet. It specifies access method and the location for the files (Reference: http://www/w3/org/pub WWW/Addressing). Documents on the Web are written in a simple "markup language" called HTML, which stands for Hypertext Markup Language. File formats of data on the Web are specified as MIME formats; MIME stands for "Multipurpose Internet Mail Extensions." (Reference: http://www.oac.uci.edu/indiv/ehood/MIME/MIME.html). Examples of file formats on the Web are .au (probably the most common audio format), .html (HTML files), .jpg (JPEG encoded images), .mid (Midi music format), .mpg (MPEG encoded video), and .ps (postscript files).

Browsers are computer programs that make convenient the viewing and maneuvering of HTML documents on the web. The two most popular browsers are Netscape's Navigator (Reference: http://www.netscape.com) and Microsoft's Internet Explorer (Reference: http://www.microsoft.com/ie/default.esp). They provide a graphical user interface with standard point-and-click navigation methods. They support HTML files.

Hot objects in HTML files are each linked to a unique URL. Typical browsers allow users to attempt to access any URL. Sometimes browsers either employ, or are served by proxies which utilize, firewalls. Firewalls restrict access to certain URLs.

Often it is desirable to limit access to a relatively small set of URLs. Rather than specifying which URLs would not be accessible, as is done with firewalls, it is desirable to specify the small set of URLs. For example, an education program on a particular subject may want to keep the users focused on that specific subject. While firewalls may restrict access to undesirable sites, users can still meander to sites which are far from the subject. One implementation of the present invention has the browser list all accessible URLs. But this takes away from the browsing/searching experience. Therefore the present invention also provides the browser with the capability to allow searches of user-specified depth from the listed URLs. The invention further provides the browser with the capability of removing hot links from those pages which are at the maximum allowable depth from the listed URLs, so that users do not attempt to access these links only to receive a message that these links are not accessible.

SUMMARY

A browser utilizes a Web access controller to limit access to pre-selected web sites. Such a browser is suitable for use in education, for example, where the intent is to keep students focused on a particular subject by restricting their access to predetermined relevant sites. The browser also has a "depth" parameter, whereby users are enabled to browse from those web sites on the select list to unlisted sites which are within the depth parameter away from the listed sites. This provides the users with the surfing capabilities inherent in the web. The Web access controller provides for a safer environment for children to browse through the Internet and a worry-free tool for parents.

BRIEF DESCRIPTION OF THE DRAWINGS

For a more complete understanding of the present invention and advantages thereof, reference should be made to the following detailed description taken in connection with the accompanying drawings in which:

FIG. 3 depicts the form of a Project.

PREFERRED EMBODIMENTS

Figure 1:
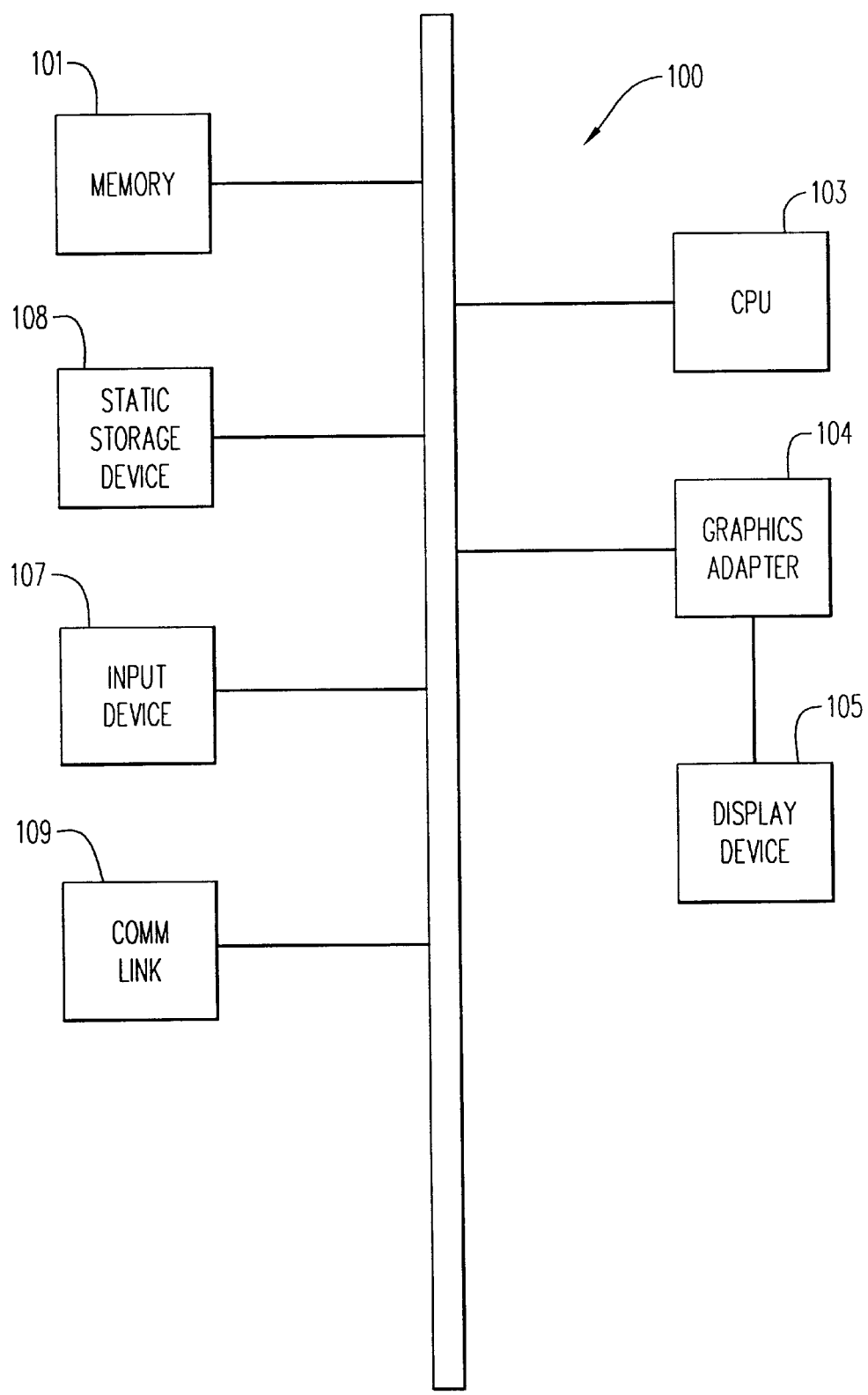
FIG. 1 illustrates a computer processing system utilized in the implementation of the preferred embodiment.

The present invention may be implemented on any computer processing system including, for example, a personal computer or a workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the nonvolatile storage device 108 and/or memory 101. In addition, the computer processing system includes a graphics adapter 104 coupled between the CPU 103 and a display device 105 such as a CRT display or LCD display. The application program and/or operating system executed by the CPU 103 generates graphics commands, for example, a command to draw a box (or window), a command to display a bit map image, a command to render a three-dimensional model, or a command to display a video file. Such commands may be handled by the application program/operating system executed by the CPU 103, or by hardware that works in conjunction with the application program/operating system executed by the CPU 103, wherein the appropriate pixel data is generated and the display device 105 is updates accordingly.

In addition, the computer processing system includes a communication link 109 (such as a network adapter or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s) over the communication link 109.

It should be noted that the application program(s)/ operating system executed by the CPU 103 may perform the methods of the present invention described below. Alternatively, portions or all of the methods described below may be embodied in hardware that works in conjunction with the application program/operating system executed by the CPU 103. In addition, the methods described below may be embodied in a distributed processing system whereby portions of such methods are distributed among two or more processing systems that are linked together via communication link 109.

Figures 2, 3A, 3B, 3C:
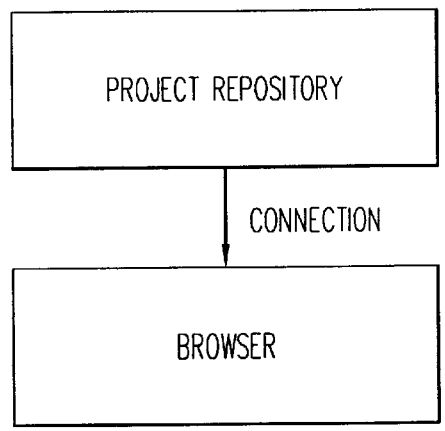
FIG. 2 is a high level view of the components of the embodiment described herein.

FIG. 2 high level view of the components of the embodiment described herein. They comprise a Repository for storing Project and serving Project pages to the browser upon request, and the special browser built for limited access. The Projects Repository is a repository for a collection of sets of URLs and files, called Projects, with a depth parameter associated with each URL of file in a Project. Such repository may be in the local storage device of the host computer or in some other storage device on some other computer which is connected to the host computer via the communications link. Each Project contains a default.htlm page, which is the first page that will be loaded on the browser when that Project is invoked. The defult.html page is either accessed as a URL if it resides on another machine, or as a file if it resides on the host machine.

FIG. 3 shows the structure of a Project. It comprises a list of URLs and files. FIG. 3A shows the overall structure. The first in the list is the header file, which may be addressed via a URL or a file name. The remaining members or the list, Page(1) to Page(N), are also URLs or file names with a depth parameter associated with each of them. FIG. 3B shows the structure of a header file. It comprises of a name, a code, and default.html page. The encrypted code will be utilized by the browser to screen out arbitrary html pages. Only pages with the appropriate encrypted code will be allowed by the browser as default.html pages. This ensures that the users do not use the browser to access undesirable locations. FIG. 3C shows the structure of the j-th page, Page(j), of the Project. It comprises its address, Address(j), which may be a URL or a local file name with its relative or specific location, its description, Description(j), which is provided by the project creator when the project is built, and its associated depth parameter, Depth(j).

Figure 4:
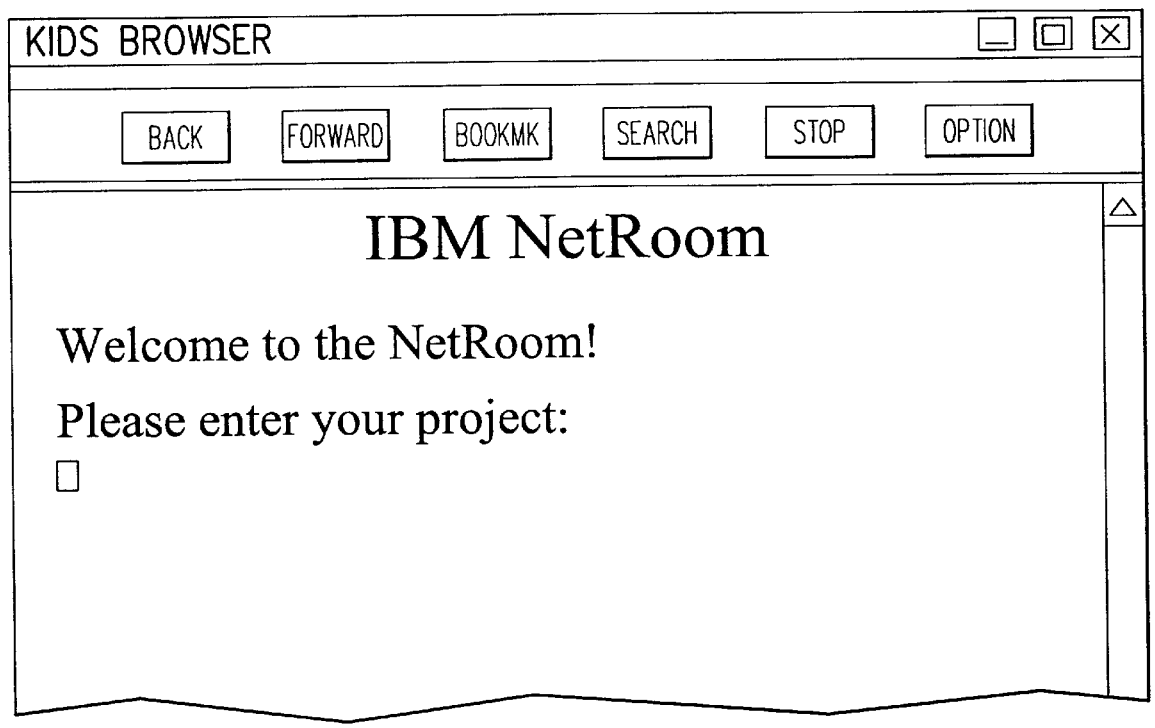
FIG. 4 shows an embodiment of a browser built specifically for use by children, who are not sophisticated users.

FIG. 4 shows an embodiment of a browser with limited functionality, designed for ease of use by naive users such as young students. It is capable of displaying html pages in standard fashion. Such pages may utilize plug-ins, in standard fashion. In particular, the pages may utilize audio, video. It may also enable interactivity such as responding to requests via keyboard entry. In FIG. 4, the request is made to enter a project name. The user will type in a project name and then press the enter key on the keyboard to initiate the desired session.

Figure 5:
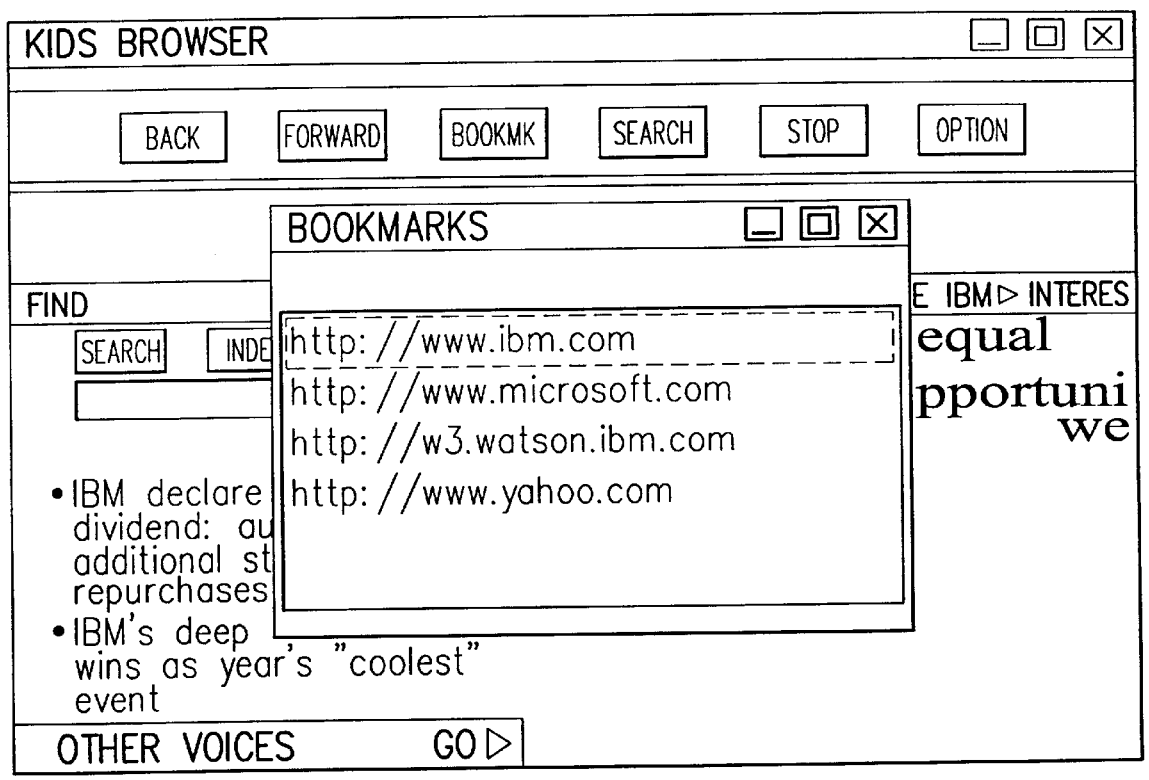
FIG. 5 shows the children's browser with the Bookmarks filed highlighted.

The browser supports the following functions, which are standard in browsers. Back retrieves a previous html page. The browser cache stores a predetermined number of pages, and also creates an ordered list of pointers to these pages. The ordering corresponds to their appearance in the browser. If a page is already in the cache and is accesses again, only a new pointer to the cached page is stored, rather than storing the whole page again. The Back function can be invoked several times consecutively. When the last page stored in the cache is reached, the Back function ceases. Forward retrieves an html page whose pointer is ahead of the one of the presently viewed page. Clicking on the Bookmark button opens a Bookmark menu, as is shown in FIG. 5. The Bookmark menu contains either the addresses of the pages in the project (as is shown in the figure) or a description of these pages. When the user clicks on an entry in the Bookmark list, the referenced page is loaded to the browser. The default.html page is an entry in the Bookmark list.

Clicking on the Search button opens a search dialogue window. The user enters a word or phrase, or a set of words or phrases connected with the word AND, and then either clicks on a mouse button or the enter key on the keyboard. This initiates a search for the words or phrases in the accessible web pages. These pages are all the project pages in the bookmark, plus all pages which are within the depth parameter of the project pages. Thus, the search engine goes to all pages which are linked to the project pages, and those which are linked to those pages, as far down as the depth parameter indicates. The results are then displayed in the browser.

The Stop button stops the various actions of the browser. For example, if a page is requests and a URL is located but the response from the URL server is very slow, the user may abandon the request. Likewise, if a search process is taking too long, the user may abandon the process.

The Option button opens up an options menu. Options may include disabling pictures (graphics and video) in order to speed up the performance, network and security settings, and default address of the repository of projects. Access to the options menu is controlled by a password, so that naive users will have no access to it.

Figure 6:
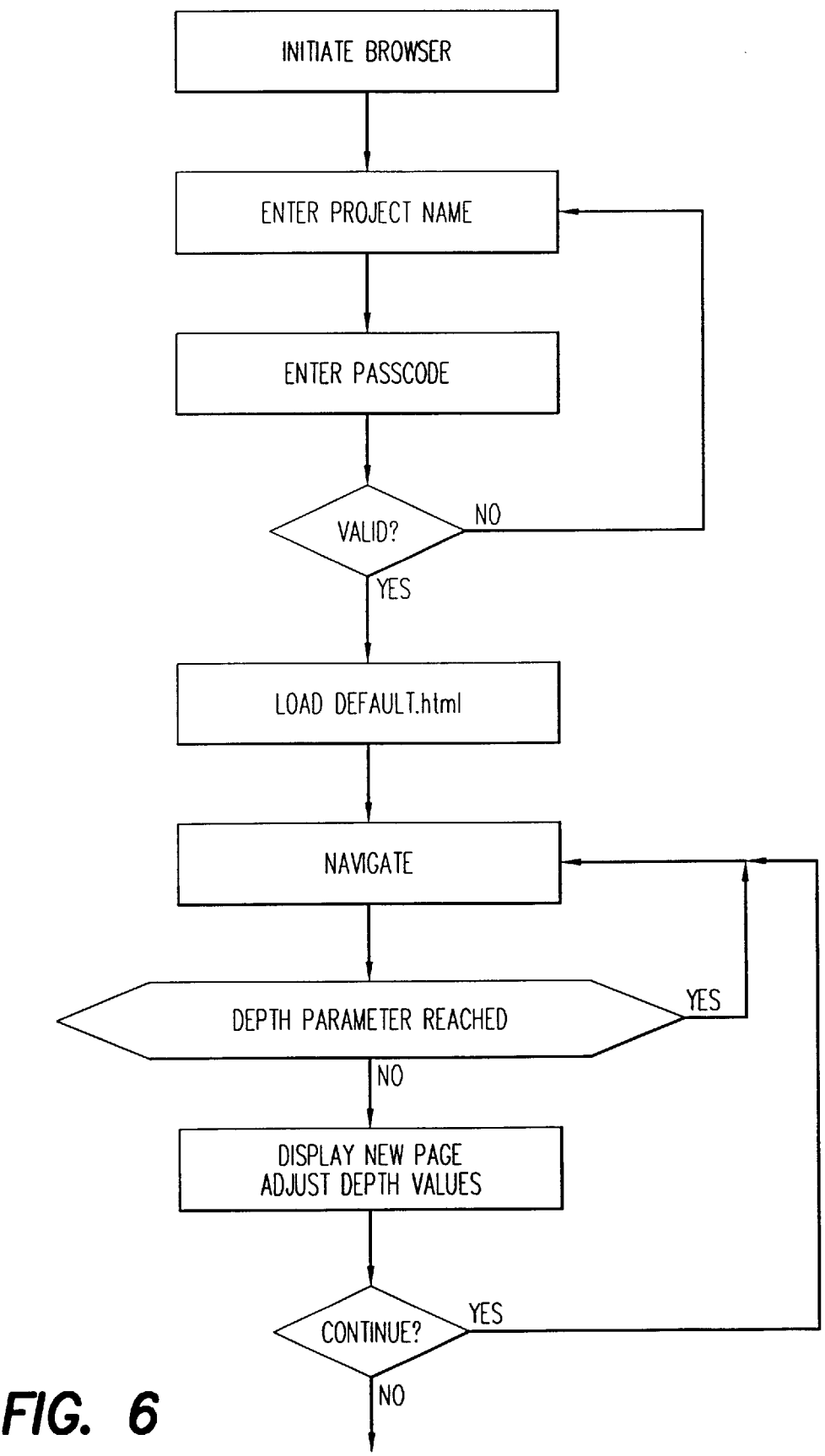
FIG. 6 shows a flowchart of navigation via the browser.

FIG. 6 shows a flowchart of navigation via the browser When the browser is first activated, it appears on the computer screen as shown in FIG. 4. The browser requests a project name. The user types in a project name and clicks to enter. The browser than asks the user to enter the passcode. The user enters the passcode. The name and passcode are sent to the default address of the repository of projects. The repository matches the name with the project whose header file has the same name, and then checks that passcode matches the one in the header file. If it does, then it sends the default.htm portion of the header file and the Project list to the browser. The default.html is displayed in the browser. Simultaneously, a program resident in the browser creates a bookmark file comprising the description portions of the various pages of the project. The default.html generally gives a broad overview of the project contents. For example, if the Project is a lesson, then the default.html page is an introduction to the lesson. It may provide an outline to the lesson and tell the student what is expected from her at the end of the lesson. It may also contains links to where the lesson should next proceed, with instructions to proceed there. The user peruses the default.html page until she decides to access another page. The user can access the next page either by clicking on a hot link in the default page or by going to the Bookmark file and clicking on one of the pages listed there.

The browser keeps a list of all pages visited. When first invoked the list comprises all the pages listed in the Bookmark file, which are the Project pages. Attached to each page on the list is a list of depth values d(j), which corresponds to the depth of the page from the Project page Page(j). The depth values of the Project pages are all set to 0. When a new page is requested by clicking on a hot spot of a page which is presently displayed (such a page is called an initiating page), the browser first checks whether the initiating page's depths d(j) are equal to the the corresponding associated depths D(j) of the Project pages. If any d(j)=D(j), then the browser will not allow the requested page to be downloaded and displayed, unless that page has already been displayed. If the requested page is a new page and is displayed, its depth values are set as follows: the new page inherits the d(j) from the initiating page, and then all the non-zero values of the d(j) are updated to d(j)+1, and those d(j) which are equal to 0 remain 0. If the requested page has already been displayed, it keeps the depth values d(j) it had when it was previously displayed. When a new page is requested by clicking on an item corresponding to Page(k) in the Bookmark list, the d(j) are all set to 0.

What is claimed is:

1. A system for limiting user access to a set of Web pages, said system comprising:

means for storing a first Web page and a control depth parameter value associated with said first Web page, wherein said control depth parameter value indicates a maximum permitted linking distance from said first Web page to another Web page; and browser means for accessing a second Web page only if said second Web page is at a depth permitted by said control depth parameter value, wherein said browser means denies access to said second Web page if said second Web page is at a depth of greater than said control depth parameter value.

2. The system as recited in claim 1, wherein said first Web page includes a link to an associated Web page, and wherein said associated Web page includes a depth parameter value.

3. The system as recited in claim 2, wherein said browser means inhibits display of said second Web page if a presently displayed Web page has a depth parameter equal in value to said control depth parameter value.

4. The system as recited in claim 2, wherein said browser means, in response to a request for display of a particular Web page, loads a list of Web pages associated with said particular Web page.

5. The system as recited in claim 1, wherein said browser means causes display of a default Web page when said browser means is initially launched and, in response to a user entry which requests a project Web page, requests a user-entered code to confirm validity of the request and that such project Web page is present in said storage means.

6. The system of claim 1, wherein said browser means prohibits said first web page from offering a hyperlink to said second web page, if said second Web page is at a depth of greater than said control depth parameter value.

7. A system for enabling user access to a determined set of Web pages, said system comprising:

storage means for holding project Web pages and auxiliary data associated with said project Web pages, said auxiliary data including a control depth parameter value associated with each project Web page and further including linking information for accessing associated Web pages, if any; and browser means for accessing Web pages, said browser means limited by each said control depth parameter to an ability to access only a set of said associated web pages, wherein each said associated Web page includes a depth parameter value, and wherein said browser means updates depth parameters of associated Web pages as follows:

(i) when a new associated Web page is requested by a user's selection of linking data from a Web page that is currently displayed, checking whether a depth parameter value d(j) of the currently displayed Web page is equal to an associated control depth parameter D(j) value and if d(j)=D(j), inhibiting download and display of the requested associated Web page; and (ii) if the requested associated Web page is a new page and has a depth parameter value d(j)<D(j), said requested associated Web page is displayed, and its depth parameter value is reset as follows: the new page inherits the d(j) value from the currently displayed Web page and the d(j) value is updated to d(j)+1.

8. The system as recited in claim 7, wherein said browser means responds to a request to display an associated Web page that has already been displayed, by not changing a depth parameter value previously assigned thereto and re-displaying the associated Web page.

9. The system as recited in claim 7, wherein said browser means updates depth parameters of associated Web pages when a project Web page is requested by the user, by setting the depth parameter value of each associated web page d(j)=0.

10. A memory media containing instructions for controlling a processor for limiting user access to a set of Web pages, said memory media comprising:

means for controlling said processor to store a first Web page and a control depth parameter value associated with said first Web page, wherein said control depth parameter value indicates a maximum plied inking distance from said first Web page to another Web page; and means for controlling said processor to access a second Web page only if said second Web page is at a depth permitted by said control depth parameter value, and to deny access to said second Web page if said second Web page is at a depth of greater than said control depth parameter value.

11. The memory media of claim 10, wherein said means for controlling said processor to access said second web page prohibits said first web page from offering a hyperlink to said second web page, if said second Web page is at a depth of greater than said control depth parameter value.

* * * * *